United States Patent [19]
Kjeldsen

[11] Patent Number: 5,984,660
[45] Date of Patent: Nov. 16, 1999

[54] APPARATUS FOR PROCESSING PLASTIC SHEET

[75] Inventor: Peter Kjeldsen, Delaware, Canada

[73] Assignee: Otron Tech Inc., Wallaceburg, Canada

[21] Appl. No.: 08/800,044

[22] Filed: Feb. 14, 1997

[51] Int. Cl.[6] .................................................. B29C 45/78
[52] U.S. Cl. .................... 425/547; 264/328.14; 425/552; 425/556
[58] Field of Search ................................ 425/403.1, 444, 425/436 R, 384, 445, DIG. 48, DIG. 200, DIG. 201, 547, 552, 556; 264/237, 348, 336, 328.14

[56] References Cited

U.S. PATENT DOCUMENTS

| | | | |
|---|---|---|---|
| 3,914,104 | 10/1975 | Dean et al. | 425/397 |
| 4,005,967 | 2/1977 | Ayres et al. | 425/326 R |
| 4,055,033 | 10/1977 | Garrett | 53/122 |
| 4,462,786 | 7/1984 | Perryman | 425/388 |
| 4,676,944 | 6/1987 | Korb et al. | 264/325 |
| 4,929,164 | 5/1990 | Duina | 425/145 |

Primary Examiner—Tim Heitbrink
Attorney, Agent, or Firm—George A. Seaby

[57] ABSTRACT

The usual practice when molding thermoplastic sheets is to form the sheets in a closed mold and leave the sheets in the mold until the sheets have cured sufficiently for removal and further processing or shipping. The sheet cooling or curing step is the longest step in the molding operation. In order to speed up the process, it is advantageous to remove the plastic sheet from the mold for cooling the sheet at a location separate from the mold. The present invention provides a simple sheet cooling apparatus, which is similar to a mold, including a lower cooling clamp fixed in a frame, an upper cooling clamp movably mounted in the frame for movement between an open position in which the clamps are spaced apart for receiving a plastic sheet, and a closed position in which the sheet is sandwiched between the upper and lower clamps, a manifold at one end of each clamp for introducing cooling water into both clamps and a second manifold at the other end of each clamp for discharging the cooling water. The invention also provides a transfer mechanism for simultaneously removing a first sheet from the mold and a second sheet from the cooling clamp for further processing or shipping.

7 Claims, 7 Drawing Sheets

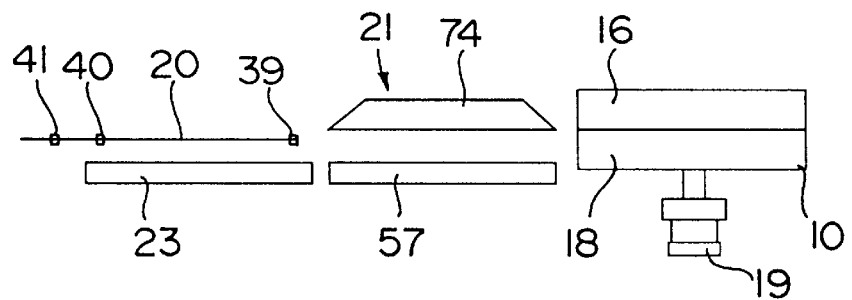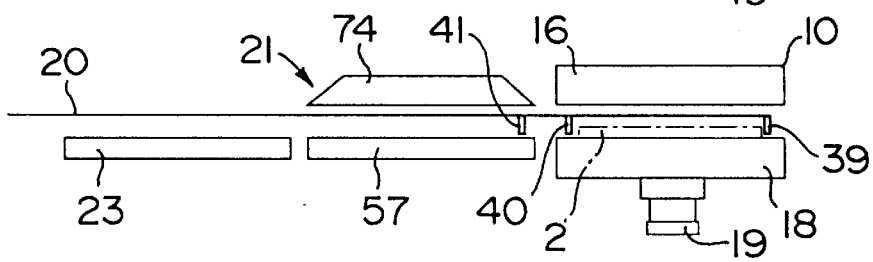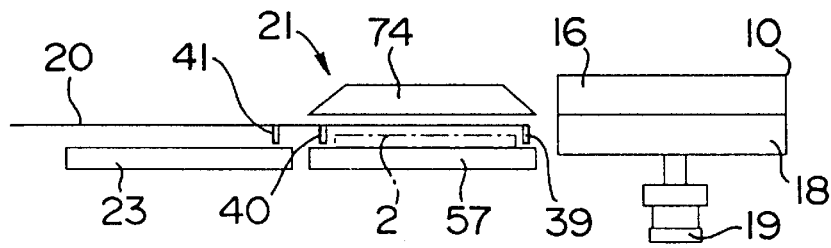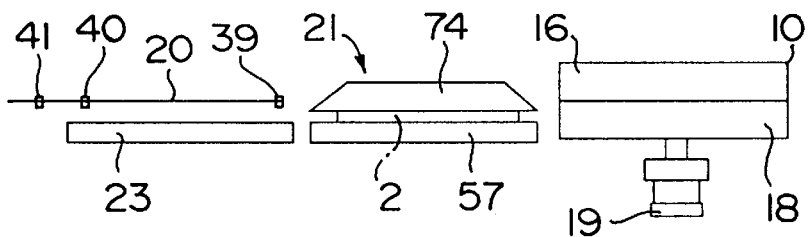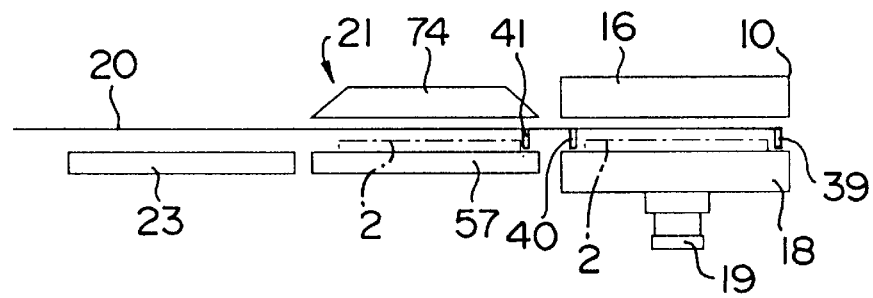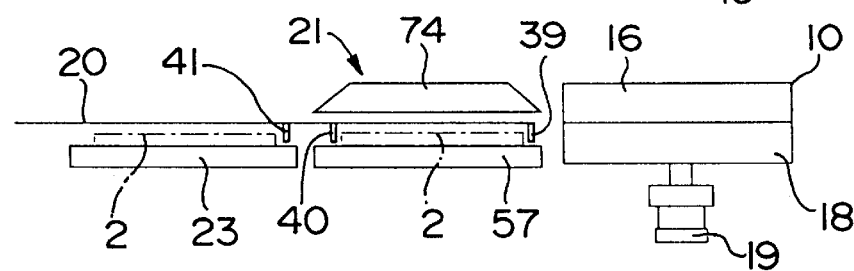

APPARATUS FOR PROCESSING PLASTIC SHEET

BACKGROUND OF THE INVENTION

1. Field of the Invention

This invention relates to an apparatus for processing a molded plastic sheet.

More specifically, the invention relates to an apparatus for transferring a thermoplastic sheet from a mold to a cooling clamp.

2. Discussion of the Prior Art

Thermoplastic sheets are usually molded in large molds by injecting plastic into the mold under pressure. The density of the finished product can be changed by adding a foaming agent to the plastic in the extruder. Following injection, the sheet is left in the mold for a predetermined period of time to allow the plastic to cure. Following curing, the mold is opened and the plastic sheet is removed. The mold is again closed, and the cycle of injection, curing, mold opening and part removal is repeated. Obviously, the duration of each cycle is determined by the length of time required to perform each step. One of the most time consuming steps of the molding operation is the curing step. If the time spent in the mold for curing can be reduced, then the duration of the entire molding operation can be shortened.

GENERAL DESCRIPTION OF THE INVENTION

An object of the present invention is to overcome the above mentioned problem by providing a relatively simple apparatus for cooling the article at a location spaced apart from the mold location, whereby cooling can be effected while a new molding cycle is carried out.

Another object of the invention is to provide a transfer mechanism for moving a molded sheet from the mold to a cooling apparatus while simultaneously removing a cooled sheet from the cooling apparatus for further processing.

According to one aspect the invention relates to an apparatus for cooling a thermoplastic sheet produced in a mold, which includes a bottom mold half and a top mold half for defining a mold cavity, said apparatus comprising:

(a) frame means;

(b) lower clamp means in said frame means for receiving a molded sheet from the mold;

(c) upper clamp means movable in said frame means between an open position spaced apart from said lower clamp means and a closed position, in which the plastic sheet is sandwiched between said upper clamp means and said lower clamp means;

(d) drive means for moving said upper clamp means between the open and closed positions, and for applying pressure to the plastic sheet during cooling; and (e) passage means extending through said lower and upper clamp means for carrying a cooling fluid through said clamp means for effecting cooling while the plastic sheet is clamped between said clamp means.

According to another aspect the invention relates to a transfer mechanism for removing a thermoplastic sheet from a mold, which includes a bottom mold half, and a top mold half for defining a mold cavity for molding the sheet, and a fluid actuated cylinder for opening and closing the mold cavity, said apparatus comprising track means adjacent the mold; carriage means slidable on said track means for movement between a retracted position remote from said mold and an extended position proximate said mold; shaft means rotatable on said carriage means and extending outwardly from said carriage means for entering an open mold when said carriage means is moved from the retracted position to the extended position; drag dog means on said shaft means for rotation with said shaft means between a rest position and a sheet engaging position in which said dog means engage the sheet for dragging the sheet from the mold when the carriage means and consequently said shaft means are moved from the extended to the retracted position.

BRIEF DESCRIPTION OF THE DRAWINGS

The invention is described hereinafter in greater detail with reference to the accompanying drawings, which illustrate a preferred embodiment of the invention, and wherein:

FIGS. 7 to 12 are a series of schematic side views of the mold, cooling apparatus and transfer mechanism of FIGS. 1 and 2 illustrating the operating of the latter.

It is worthwhile noting that for the sake of simplicity a variety of elements have been omitted from several figures of the drawings.

DESCRIPTION OF THE PREFERRED EMBODIMENT

While the following detailed description relates to a multi-mold machine, it will be appreciated that the apparatus of the present invention can be used with a single mold machine.

Figure 1:
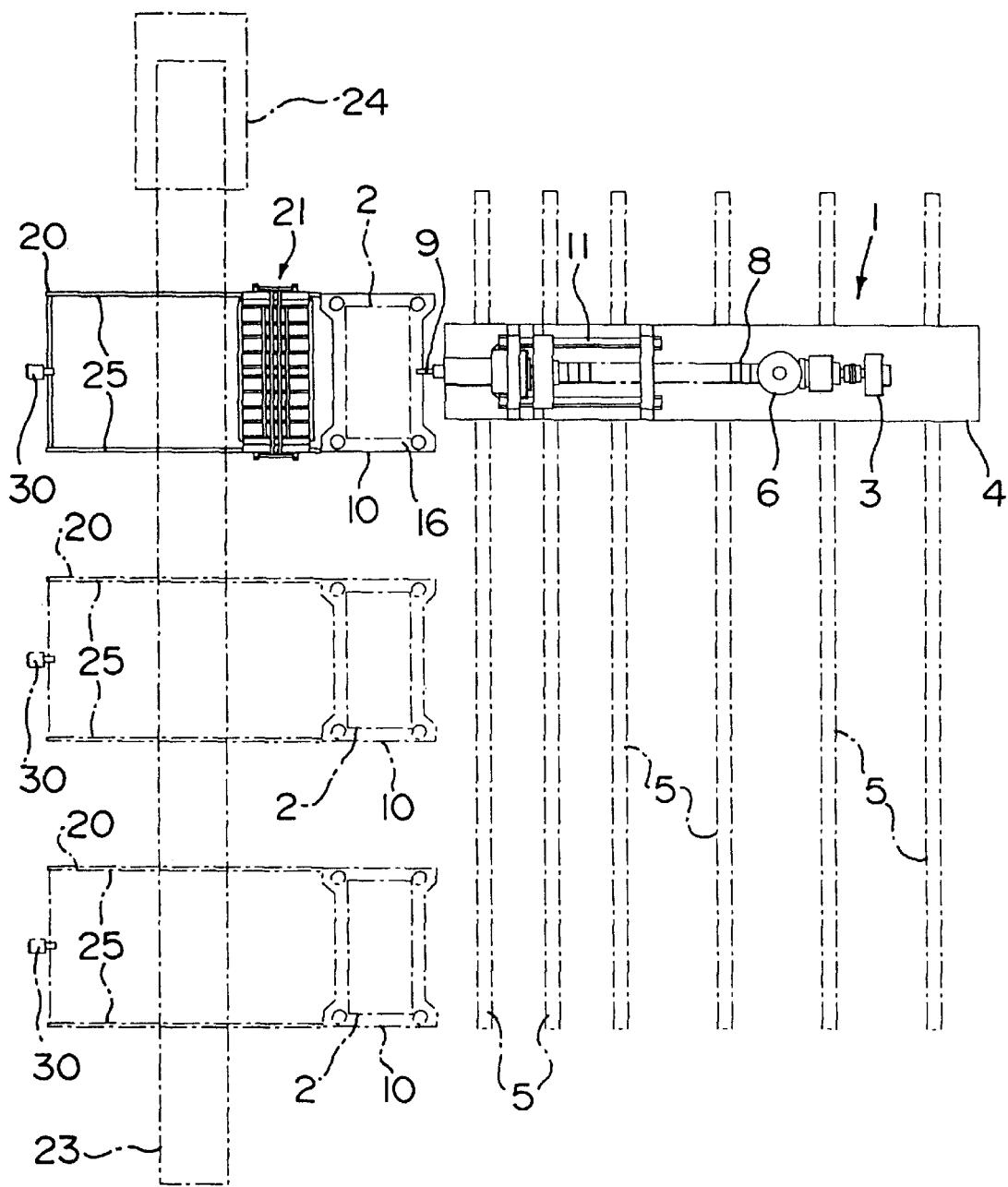
FIG. 1 is a schematic top view of a machine for molding plastic sheets, a sheet cooling apparatus and transfer mechanism in accordance with the present invention.
Figure 2:
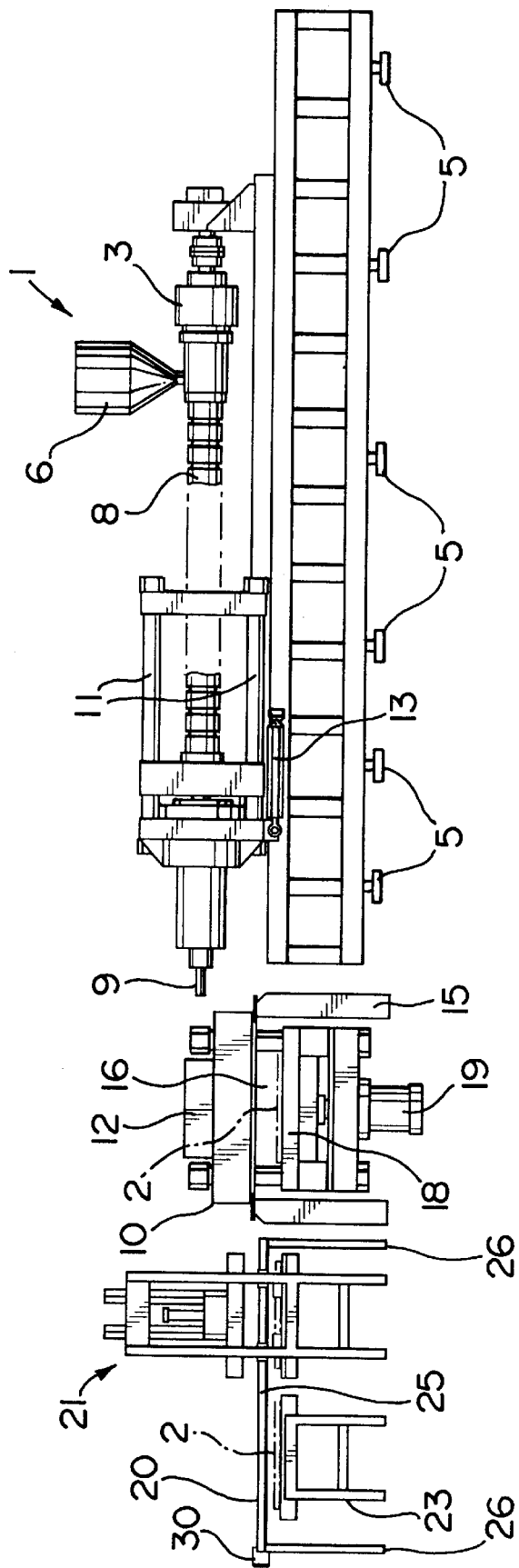
FIG. 2 is a schematic side view of the molding machine, cooling apparatus and transfer mechanism as seen generally along line II—II of FIG. 1.

With reference to FIGS. 1 and 2, the apparatus of the present invention is intended for use with a molding machine generally indicated at 1 which is designed to mold thermoplastic sheets 2.

The molding machine 1 includes an extruder 3 mounted on a carriage 4, which is transversely slidable on a plurality of tracks 5.

The extruder 3 includes a hopper 6 for receiving solid thermoplastic material in pellet form, which is fed through a barrel 8 to a nozzle 9 for injection into a mold 10. The nozzle 9 is slidably mounted on tracks defined by shafts 11 for moving the nozzle from a retracted position spaced apart from a mold 10 to a position against the mold 10. The extruder 3 is intended for use with a plurality of molds 10 (in this case three), i.e. a single extruder 3 injects thermoplastic material into a plurality of molds 10 which remain in fixed positions in a row at one side of the rows of tracks 5.

In operation, the extruder 3 moves successively from one mold location to another. When the extruder 3 is properly aligned with a mold 10, the extruder is stopped. The nozzle 9 is moved longitudinally against a manifold 12 on the top of the mold 10 using hydraulic cylinder 13. The manifold 12 contains injection an port (not shown) for introducing plastic into the mold. Thermoplastic material is dispensed from the hopper 6 into the barrel 8, which is heated for melting the plastic. Melted plastic is injected under high pressure into the mold cavity (not shown) to form a sheet 2.

As best shown in FIG. 2, the mold 10 is defined by a frame 15 carrying two mold halves, namely a fixed mold top 16 and a vertically movable mold bottom 18. The mold bottom is reciprocated using a hydraulic cylinder 19 between a closed position against the mold top 16 and an open position.

In conventional molds of this type, the sheet 2 remains in the mold 10 to cure while the nozzle 9 is retracted and the extruder is moved along the tracks 5 to the next mold location where the molding procedure is repeated. In the present case, the sheet 2 is removed from the mold 10 as soon as it is cured enough to retain its structural integrity, and transferred by a transfer assembly 20 to a cooling apparatus 21. Following cooling or curing, the sheet 2 is moved from the apparatus 21 to a conveyor 23 for transfer to a sheet cutter assembly 24 (FIG. 1).

Figure 3:
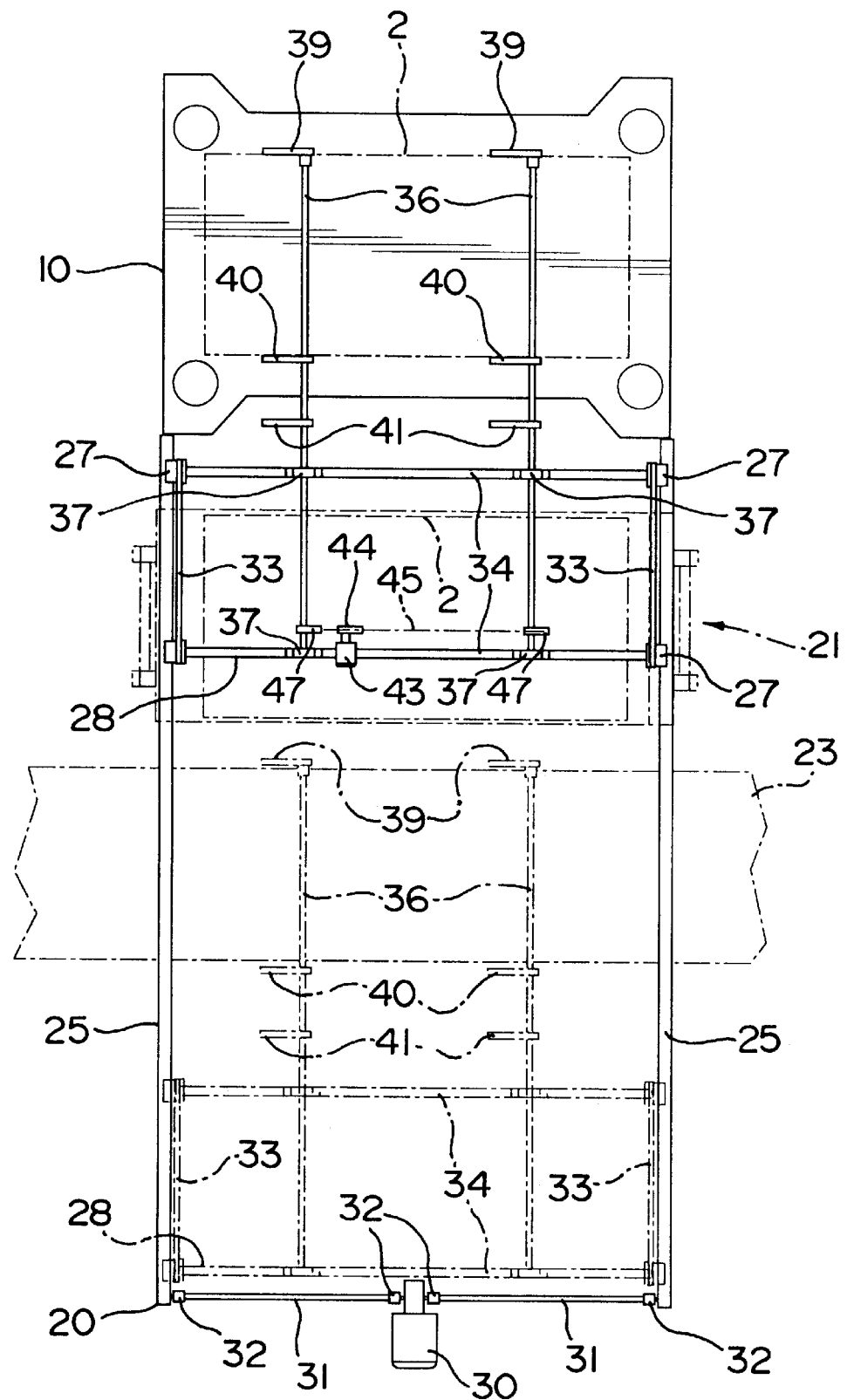
FIG. 3 is a schematic plan view of the transfer mechanism and cooling apparatus in accordance with the invention.

Referring to FIG. 3, the transfer assembly 20 is defined by a pair of elongated, parallel tracks 25 mounted on the cooling apparatus 21. The ends of the tracks 25 are supported by posts 26. The tracks 25 are off the shelf hardware, for example Macron 14 linear actuators available from Macron Dynamics Inc., Horsham, Pa. Basically, the linear actuators include rails or tracks 25 carrying slides 27, which are connected to the ends of a skeletal, rectangular carriage 28. The slides 27 are caused to move along the tracks 25 by a reversible motor 30 mounted between the ends of the tracks 25. The motor 30 is connected to drive belts (not shown) in the tracks 25 by shafts 31 and flexible couplings 32. By actuating the motor 30, the carriage 28 is caused to move between a retracted position, which is shown in phantom outline in FIG. 3, and an extended position proximate the mold 10 which is shown in solid lines in FIG. 3. The carriage 28 includes a pair of sides 33 connected to the slides 27, and ends 34 extending between the sides 33. A pair of parallel shafts 36 are mounted in pillow block bearings 37 on the ends 34 of the carriage 28. The shafts 36 extend from one end 34 a long distance beyond the other end 34. Each shaft 36 carries three drag dogs 39, 40 and 41 for engaging a plastic sheet 2 in a manner described below in greater detail.

The shafts 36 and consequently the drag dogs 39, 40 and 41 are caused to rotate between horizontal rest positions and vertical sheet engaging positions by a motor 43, the shaft of which carries an arm 44. The motor 43 operates in much the same manner as a windshield wiper motor, causing the arm 44 to oscillate through an arc of 90°. A chain 45 extends between the outer end of the arm 44 and arms 47 on the ends of the shafts 36. Thus, rotation of the arm 44 causes the arms 47 to rotate in unison to move the dogs 39, 40 and 41 from the horizontal to the vertical position or vice versa.

Figure 4:
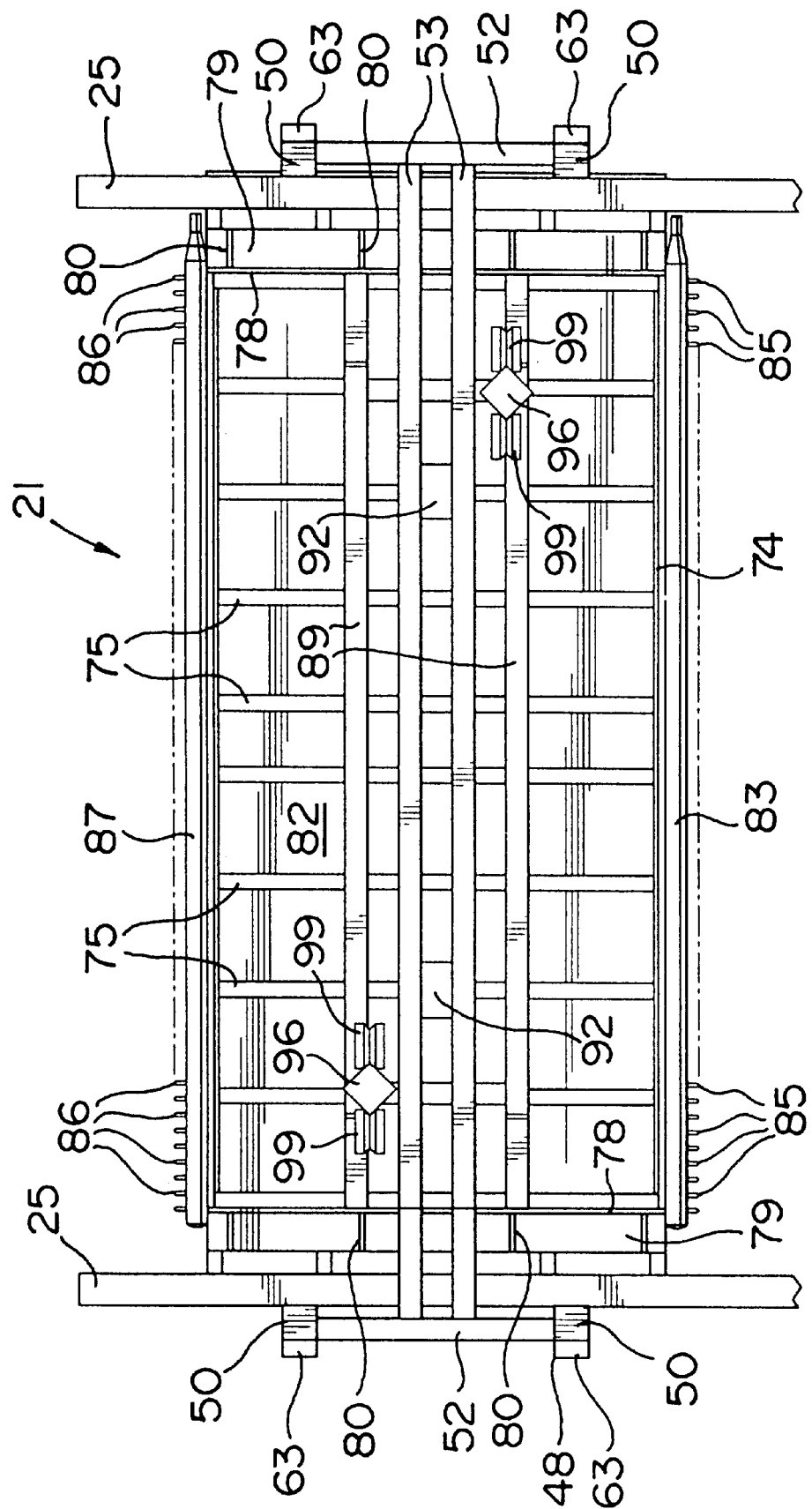
FIG. 4 is a top view of the cooling apparatus of FIGS. 1 and 2.
Figure 5:
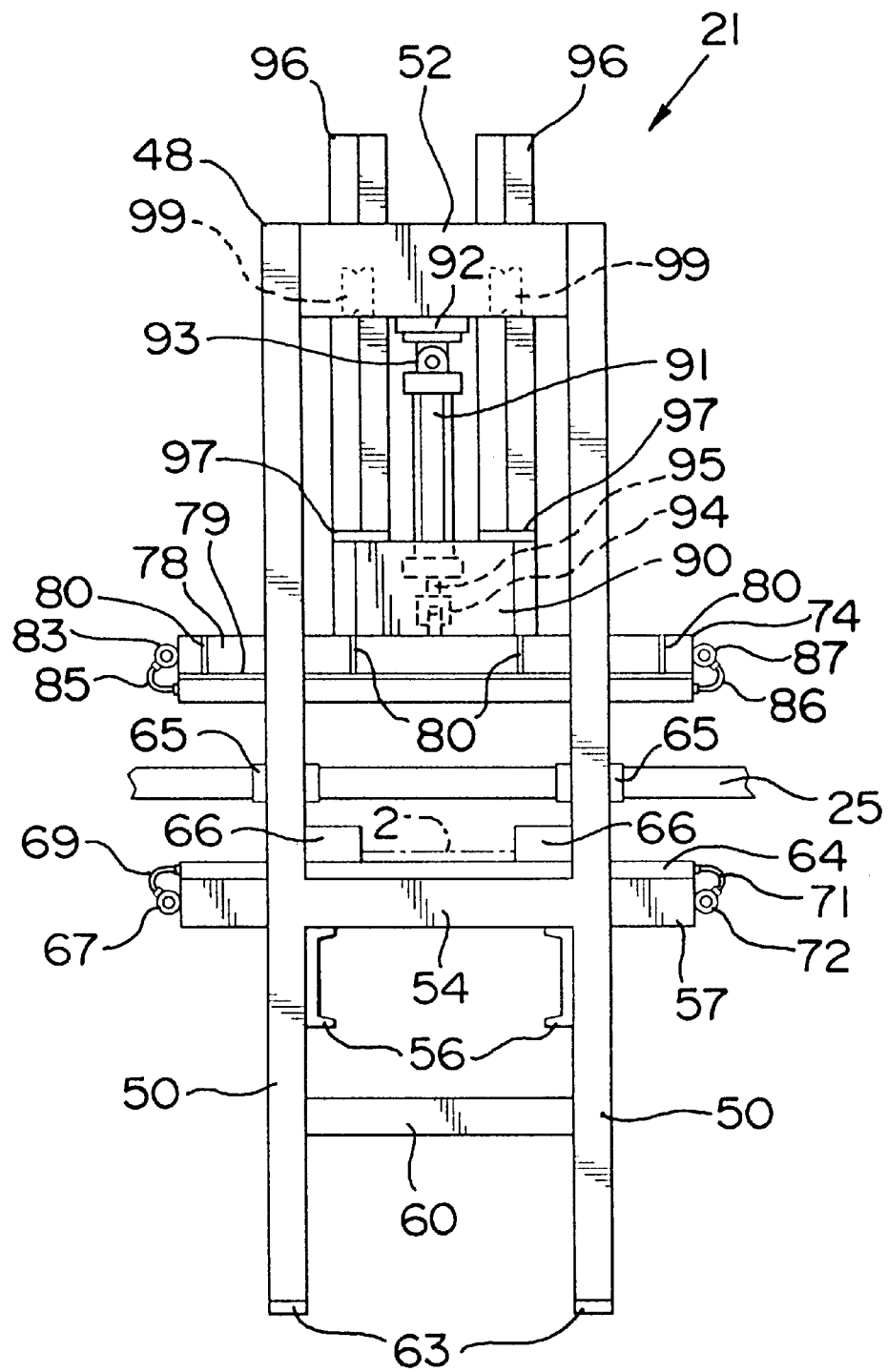
FIG. 5 is a side view of the cooling apparatus of FIG. 4.
Figure 6:
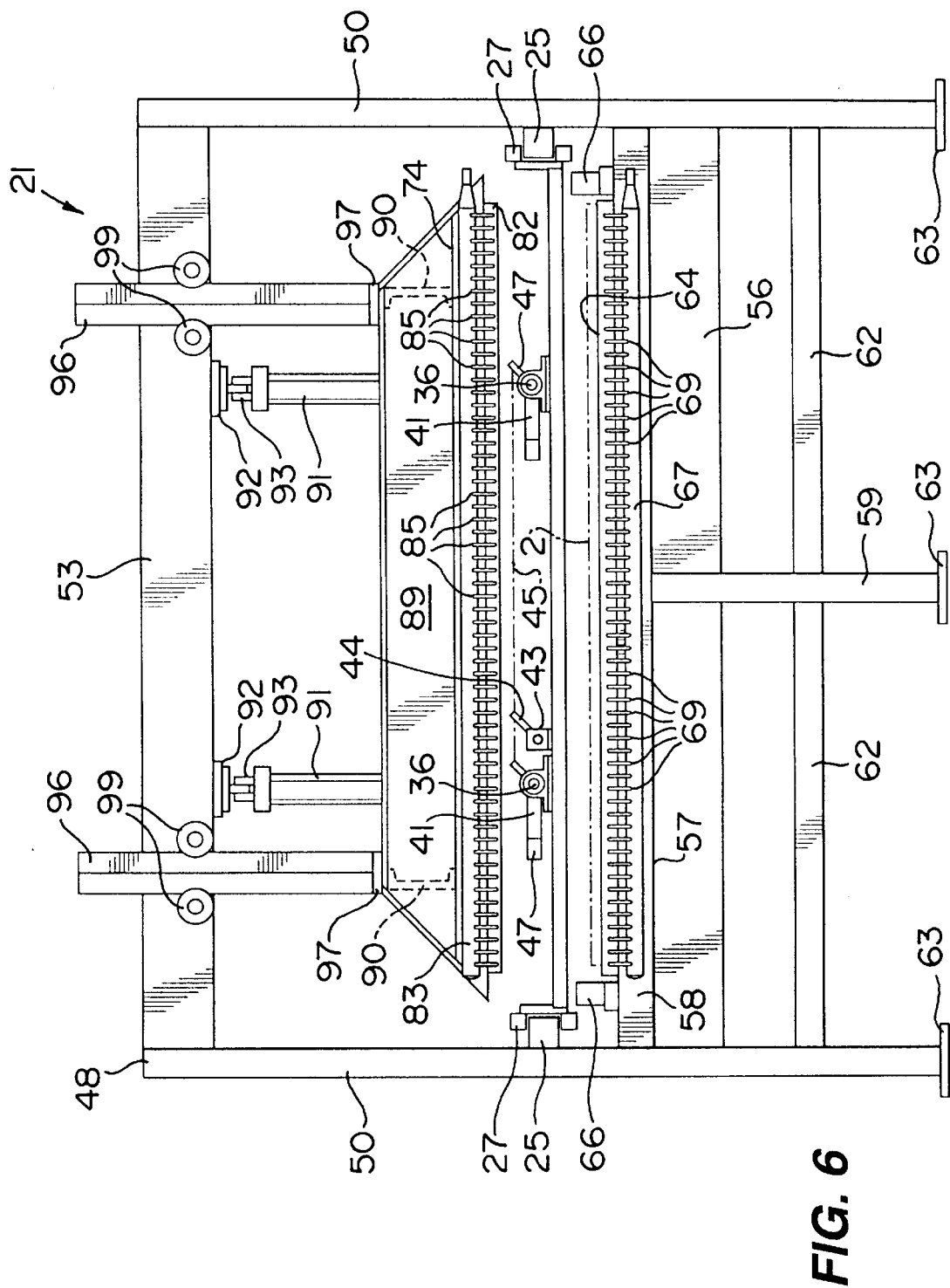
FIG. 6 is an end view of the cooling apparatus of FIGS. 4 and 5.

Referring to FIGS. 4 to 6, the sheet cooling apparatus 21 includes a skeletal frame 48 defined by four posts 50, interconnected at their top ends by side and center beams 52 and 53, respectively. An intermediate crossbar 54 (FIG. 5) extends between the posts at each side of the frame 48. C-beams 56 extend between the side posts 50 for supporting a lower platen 57. The platen 57 is formed by a plurality of steel C-beams (not shown) extending across the C-beams 56 and plates 58 (FIG. 6) on the ends of the beams 56. The middle of the lower platen 57 is supported by legs 59. Crossbars 60 extend between the legs 59, and braces 62 extend between the legs 59 and the posts 50. Feet 63 are provided on the bottom ends of each of the posts 50 and on the legs 59.

The lower platen 57 carries a rectangular aluminum cooling plate 64 for receiving a plastic sheet 2 from the mold 10. The tracks 25 of the sheet transfer mechanism are mounted in brackets 65 (FIG. 5) on the posts 50 above the plate 64. Lateral movement of the sheet 2 on the plate 64 is limited by stops in the form of rectangular blocks 66 at each side of the platen 57. A plurality of parallel passages (not shown) extend longitudinally through the plate 64 between the ends thereof. Water is introduced into the plate 64 from an inlet manifold 67 mounted on one side of the lower platen 57. Small arcuate tubes 69 connect the inlet manifold 67 to the passages in the plate 64. The water is discharged from the plate 64 via similar tubes 71 and an outlet manifold 72. The manifolds 67 and 72 are merely long tubes open at one end for receiving water and closed at the other end.

The frame 48 of the cooling apparatus also supports a vertically movable upper platen 74, which is structurally similar to the lower platen 57, including a plurality of C-beams 75 (FIG. 4) interconnected at their ends by plates 76.

Vertical and horizontal plates 78 and 79, respectively, and gussets 80 (FIG. 5) reinforce each side of the upper platen 74. The upper platen 74 carries an aluminum cooling plate 82 on its bottom surface. Like the plate 64, the plate 82 includes a plurality of parallel passages (not shown) extend longitudinally through the plate 82 between the ends thereof. Water is introduced into the passages from an inlet manifold 83 mounted on one side of the platen 74. Small arcuate tubes 85 connect the inlet manifold 83 to the passages in the plate 82, and the water is discharged from the passages via similar tubes 86 and an outlet manifold 87. The manifolds 83 and 87 are structurally similar to the manifolds 67 and 72.

Beams 89 extend the width of the upper platen 74 above the beams 75, and are interconnected near their ends by crossbars 90. The platen 74 is suspended from the top of the frame 48 by drives in the form of pneumatic cylinders 91. The cylinders 91 are connected to plates 92 extending between the beams 53 by devises 93 (FIG. 5). Additional devises 94 connect piston rods 95 extending out of the bottom ends of the pneumatic cylinders 91 to the top of the upper platen 74, so that the latter can be moved vertically in the frame 48.

Vertical movement of the upper platen 74 in the frame 48 is ensured by a guide in the form of a pair of guide bars defined by posts 96 extending upwardly from plates 97 on top of the beams 89 at opposite ends thereof, and rollers 99. The square cross section posts 96 are oriented at 45° to the longitudinal axis of the platen 74, i.e. are diamond-shaped. Opposed corners of the posts 96 are slidably mounted between a pair of rollers 99. The rollers 99 are mounted on the frame beams 53, acting as guides for the posts 96 and consequently for the upper platen 74. The cylinders 91, the ports 96 and the rollers 99 can be replaced by a rack and pinion drive and guide assembly.

The operation of the transfer mechanism 20 and the cooling apparatus is described below with particular reference to FIGS. 7 to 12. In the rest position of the transfer mechanism 20 (FIG. 7), the drag dogs 39, 40 and 41 are horizontal. During a first molding operation, the mold 10 is closed. Thermoplastic material is injected into the mold cavity to form a plastic sheet 2. The mold 10 is opened (FIG. 8), and the motor 30 is actuated to move the carriage 28 from the retracted position (shown in phantom outline in FIG. 3) to the extended position (shown in solid lines in FIG. 3). Such movement of the carriage 28 moves the shafts 36 into the space between the top mold half 16 and the bottom mold half 18 above the plastic sheet 2. The motor 43 is actuated to rotate the shafts 36, so that the drag dogs 39, 40 and 41 rotate from the horizontal to the vertical positions extending downwardly from the shafts 36. In the vertical positions, the dogs 39 and 40 engage two opposite sides of the sheet 2. The motor 30 is again actuated (in the opposite direction) to withdraw the shafts 36 from the mold 10. The dogs 39 and 40 transfer the sheet 2 from the mold 10 to the cooling apparatus 21 (FIG. 9). Meanwhile, the mold 10 is again closed to start another molding operation. The motor 30 is stopped, and the motor 43 is again actuated to rotate the shafts 36 and the dogs 39, 40 and 41 to release or disengage the sheet 2 in the cooling apparatus 21. The carriage 28 is retracted from the cooling apparatus, and the upper cooling clamp 74 is moved to the closed position (FIG. 10).

Upon completion of the next molding operation, the mold 10 and the cooling apparatus 21 are opened. The carriage 28 of the transfer mechanism 20 is again moved to the extended position, and the dogs 39, 40 and 41 are rotated to the vertical positions (FIG. 11). This time the dogs 39 and 40 engage the freshly molded sheet 2 in the mold 10 and the dogs 41 engage the sheet 2 in the cooling apparatus 21. The carriage 28 is retracted to drag the sheets 2 from the mold 10 to the cooling apparatus 21, and from the latter to the conveyor 23. The shafts 36 are again rotated to move the dogs 39, 40 and 41 to the horizontal positions, releasing the sheets 2, and the mold 10 and the cooling apparatus 21 are again closed, whereby a fresh sheet can be molded while the second sheet is simultaneously being cooled.

The cycle of mold 10 and cooling apparatus 21 opening, sheet transfer to cooling apparatus 21 and conveyor 23, and mold 10 and cooling apparatus 21 closing can then be repeated on a continuous basis. Once the operation has started, fresh sheets 2 are continuously molded successively in each mold 10 and the transfer mechanisms 20 at each molding station are successively actuated to perform the above described sequence of steps. Thus, the dwell time in each mold 10 is substantially reduced, whereby the production of finished sheets 2 is expedited.

It will be appreciated that the transfer mechanism 20 and the cooling apparatus 21 can be used with single or multiple mold systems with the same efficacy.

I claim:

1. An apparatus for cooling a thermoplastic sheet produced in a mold, said molding including a bottom mold half and a top mold half for defining a mold cavity, said apparatus comprising:
   (a) frame means;
   (b) lower clamp means including lower plate means in said frame means for receiving a molded sheet from the mold;
   (c) upper clamp means including upper plate means movable in said frame means between an open position spaced apart from said lower clamp means and a closed position, in which the plastic sheet is sandwiched between said lower plate means and said upper plate means;
   (d) drive means for moving said upper plate means between the open and closed positions, and for applying pressure to the plastic sheet during cooling;
   (e) a plurality of passages extending between the ends of each said lower and upper plate means along the entire length of each said plate means for carrying a cooling fluid through said plate means for effecting cooling while the plastic sheet is clamped between said plate means;
   (f) inlet manifold means on one end of each said lower and upper plate means for receiving cooling fluid and distributing the fluid to one end of each said passage means; and
   (g) outlet manifold means on the other end of each said lower and upper plate means for receiving the fluid from each said passage means and for discharging the fluid from the apparatus.

2. The cooling apparatus of claim 1, including guide means on said frame means for guiding said upper clamp means between the open and closed positions.

3. The cooling apparatus of claim 2, wherein said guide means includes spaced apart roller means on said frame means above said upper clamp means; and guide bar means extending upwardly from said upper clamp means between said roller means.

4. The cooling apparatus of claim 3, wherein said drive means includes fluid actuated cylinder means on said frame means carrying said upper clamp means for moving the upper clamp means between the open and closed positions.

5. The cooling apparatus according to claim 1, including a transfer mechanism for removing a plastic sheet from the mold, said transfer mechanism including track means adjacent the mold; carriage means slidable on said track means for movement between a retracted position remote from said mold and an extended position proximate said mold; shaft means rotatable on said carriage means and extending outwardly from said carriage means for entering an open mold when said carriage means is moved from the retracted position to the extended position; and drag dog means on said shaft means for rotation with said shaft means between a rest position and a sheet engaging position in which said dog means engage the sheet for dragging the sheet from the mold when the carriage means and consequently said shaft means are moved from the extended to the retracted position.

6. The cooling apparatus according to claim 5, wherein said track means includes a pair of parallel tracks on said frame means, said tracks means extending beyond the ends of said frame means, whereby carriage means can be moved between the extended position proximate the mold and the retracted position.

7. The cooling apparatus of claim 6, wherein said drag dog means include first dog means at one end of said shaft means for engaging a first plastic sheet in the mold; and second dog means on said shaft means remote from said one end of the shaft means for engaging a second plastic sheet in the cooling apparatus, whereby the first and second plastic sheets can be removed simultaneously from the mold and from the cooling apparatus when the carriage means is moved from the extended position to the retracted position.

* * * * *